P. RIESECK.

STAIRWAY.

No. 11,032. Reissued Oct. 1, 1889.

Witnesses
J. M. Fowler Jr.
Geo. E. Boulton

Inventor
Peter Rieseck.

By his Attorney
W. P. Potter,

N. PETERS, Photo-Lithographer, Washington, D. C.

UNITED STATES PATENT OFFICE.

PETER RIESECK, OF ALLEGHENY, PENNSYLVANIA.

STAIRWAY.

SPECIFICATION forming part of Reissued Letters Patent No. 11,032, dated October 1, 1889.

Original No. 362,537, dated May 10, 1887. Application for reissue filed May 3, 1889. Serial No. 309,510.

*To all whom it may concern:*

Be it known that I, PETER RIESECK, of Allegheny, in the county of Allegheny and State of Pennsylvania, have invented certain new and useful Improvements in Construction of Stairways; and I do hereby declare the following to be a full, clear, and exact description of the invention, that will enable others skilled in the art to which it appertains to make and use the same, reference being had to the accompanying drawings, and to the letters of reference marked thereon, which form a part of this specification.

My invention relates to a stairway such as is used on fire-escapes or outside structures, the objects being to provide a stairway that will be adjustable in all of its parts; also, to provide a stairway that will be easily ascended or descended; and, with these ends in view, my invention consists in certain details of construction and combination of parts, as will be fully described hereinafter.

Figure 2:
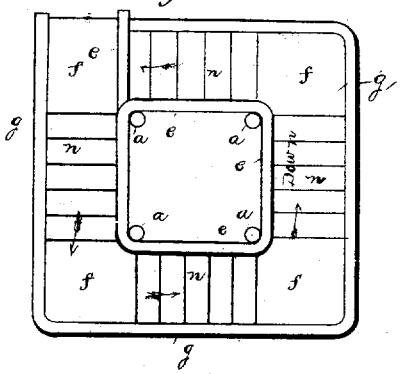
Figure 1:
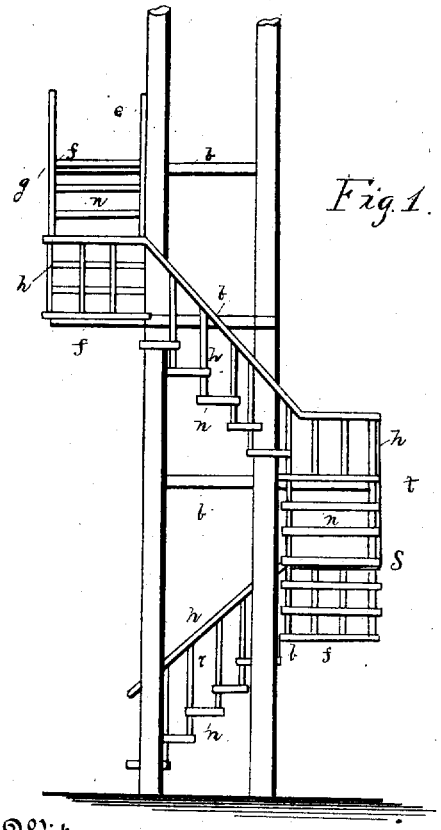
Figure 3:
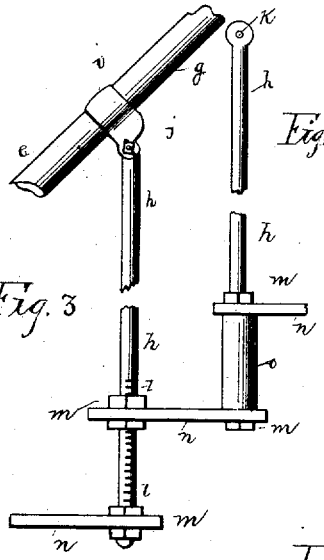
Figure 4:
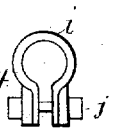
Figure 5:
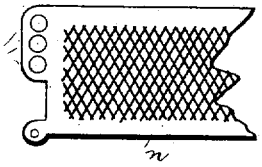
Figure 6:
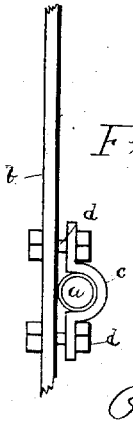

In the accompanying drawings, Figure 1 is a side elevation of my improved stairway constructed spirally about one or more vertical posts constructed in accordance with my invention. Fig. 2 is a plan view of the same. Fig. 3 is an enlarged detailed side elevation of a portion of the stairway, showing the manner in which the hand-rail, balusters, and steps are attached to each other. Fig. 4 is an end view of the strap or clamp which connects the hand-rail and balusters together. Fig. 5 is a plan view of one end of a step, showing the means of adjusting the tread of the same. Fig. 6 is a plan view of the bracket for supporting the platform and stairways and means by which the same is secured to the vertical columns.

To put my invention into practice, I prefer to erect a number of columns *a* in the form of a square, and secure the same in that position by braces at the top until the stairway has been completed. I now secure a long metallic strip *b* of the desired size to the side of two of the columns *a* by clamp *c* and bolts *d*. This clamp *c*, I construct smaller in diameter than the columns *a*, which allows the same to be securely attached thereto. I now secure an inner hand-rail *e* to the columns *a* in an oblique position, which winds about the columns *a*. A second or outside hand-rail *g* is placed in position, as shown, of the same length and form of construction as that before described, each of which has at intervals short horizontal parts corresponding to the platforms *f* of the stairway. To these two hand-rails *e* and *g*, I secure the balusters *h* by means of a band or clamp *i*, which encircles the hand-rails, and provided with a bolt *j*, which I pass through an opening *k* in the top of the baluster *h*. This bolt *j* serves to clamp the band *i* about any portion of the hand-rails *e* or *g*, and also secures the balusters to the bands *i*. At the lower end of the balusters *h*, I form a long screw-thread *l*, on which I place four nuts *m*, one above and below each step *n*; or a distance-piece *o* may be placed between the steps *n*, consisting of a hollow section of tubing cut to the proper length and placed over the threaded portion of the balusters *h* between the steps *n*. At the rear of each of the steps *n*, I form two or more circular openings *q*, in any one of which the balusters *h* may be placed, thus changing the tread of the stairway. The first flight of steps *r* consists in those erected from the ground, beginning at one column and ending at the next, at which point a small square platform *f* is constructed and supported by the hand-rails *e g* and brace or bracket *b*, which extends from one across the adjacent column and secured to both, the platforms being secured to the projecting portion of the bracket, whereby the steps and platforms may be supported entirely by the columns. Another flight *s* is commenced at the column where the first flight stopped, but at right angles, thus leaving a landing space or platform. Another flight at the top of the last mentioned is reached. By this construction I form a continuous flight of steps, each having a square or equal sided tread, which is much easier and safer to ascend or descend.

By means of the clamp *i*, the threaded portion of the balusters, and the several openings *q*, formed in the steps *n*, the tread of the same may be altered, adjusted, or changed at will.

Having thus described my invention, what I claim, and desire to secure by Letters Patent, is—

1. The combination, with the vertical columns, of the braces extending from one across the adjacent column and secured to both, and the platforms secured to the projecting portions of the braces, whereby the steps and platforms may be supported entirely by the columns, substantially as specified.

2. The combination, with the independent supporting-columns, of the platforms, and the steps of equal width or tread connecting said platforms, and the braces *b*, extending from one across the adjacent column and secured thereto and projecting outwardly therefrom to support said platforms, substantially as specified.

3. A stairway consisting of four columns arranged relatively at right angles to each other, a hand-rail surrounding the said columns, platforms supported by the columns, the balusters having their lower ends threaded and provided with nuts for securing the same to the steps, and the clamps embracing the hand-rail and bolted to openings in the upper ends of the balusters, substantially as specified.

4. The combination, in a stairway, of steps having perforations, as described, for changing the tread, balusters adapted to be secured vertically to the said steps, and a clamp at the upper end of said balusters, whereby the hand-rail may be connected at desired points, substantially as specified.

5. In a stairway such as described, the combination consisting of the hand-rails *e* and *g*, the balusters *h*, and the adjustable clamps *i*, for securing the same to the hand-rails, the threaded portion of the balusters *h*, and the nuts *m*, and a step having two or more openings *q* formed in the same, whereby the tread of the step may be changed or adjusted to any required height and width, substantially as described.

In testimony whereof I affix my signature in presence of two witnesses.

PETER RIESECK.

Witnesses:
JOS. R. MCQUAIDE,
HOMER L. CASTLE.